United States Patent
Miyahara et al.

(10) Patent No.: US 10,360,934 B2
(45) Date of Patent: Jul. 23, 2019

(54) CARRIAGE DEVICE

(71) Applicant: CANON KABUSHIKI KAISHA, Tokyo (JP)

(72) Inventors: Atsushi Miyahara, Higashikurume (JP); Kazuo Ohyama, Kawasaki (JP); Keisei Hakamata, Kawasaki (JP); Haruo Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/660,303

(22) Filed: Jul. 26, 2017

(65) Prior Publication Data

US 2018/0033456 A1   Feb. 1, 2018

(30) Foreign Application Priority Data

Jul. 29, 2016   (JP) .................................. 2016-149979

(51) Int. Cl.
  *G11B 5/55*   (2006.01)
  *B41J 11/20*   (2006.01)
  *B41J 25/308*   (2006.01)

(52) U.S. Cl.
  CPC ............. *G11B 5/5552* (2013.01); *B41J 11/20* (2013.01); *B41J 25/3082* (2013.01); *B41J 25/3086* (2013.01)

(58) Field of Classification Search
  CPC .. B41J 25/3088; B41J 25/308; B41J 25/3082; B41J 25/3086
  See application file for complete search history.

(56) References Cited

U.S. PATENT DOCUMENTS

| | | | | |
|---|---|---|---|---|
| 5,322,377 | A * | 6/1994 | Asai ..................... | B41J 25/3088 400/55 |
| 6,450,710 | B1 * | 9/2002 | Foster ..................... | B41J 11/20 347/37 |
| 6,736,557 | B2 * | 5/2004 | DeVore ................ | B41J 25/3088 400/354 |
| 7,731,319 | B2 * | 6/2010 | Murcia .................. | B41J 25/308 347/19 |
| 7,918,518 | B2 * | 4/2011 | Tanahashi .............. | B41J 25/308 347/101 |
| 8,109,585 | B2 * | 2/2012 | Iwakura ................. | B41J 25/308 347/37 |

(Continued)

FOREIGN PATENT DOCUMENTS

| | | |
|---|---|---|
| CN | 1982072 A | 6/2007 |
| CN | 105275985 A | 1/2016 |
| JP | 2007-144766 A | 6/2007 |

*Primary Examiner* — John Zimmermann
(74) *Attorney, Agent, or Firm* — Canon U.S.A. Inc., IP Division

(57) ABSTRACT

A carriage device includes a first guide member and a second guide member for supporting a carriage with a head mounted thereon at two separate positions and guiding reciprocation of the carriage, a first adjustment unit configured to adjust a height of the carriage relative to the first guide member through movement of the carriage, and a second adjustment unit configured to adjust a height of the carriage relative to the second guide member through the movement of the carriage. The carriage device can sequentially perform a first operation of changing the height of the carriage by the first adjustment unit and a second operation of changing the height of the carriage by the second adjustment unit.

8 Claims, 11 Drawing Sheets

(56) References Cited

U.S. PATENT DOCUMENTS

| | | | |
|---|---|---|---|
| 8,454,107 B2* | 6/2013 | Kuo | B41J 25/3082 347/8 |
| 2004/0091297 A1* | 5/2004 | Kelley | B41J 25/308 400/55 |
| 2006/0257185 A1* | 11/2006 | Furihata | B41J 25/3088 400/55 |

* cited by examiner

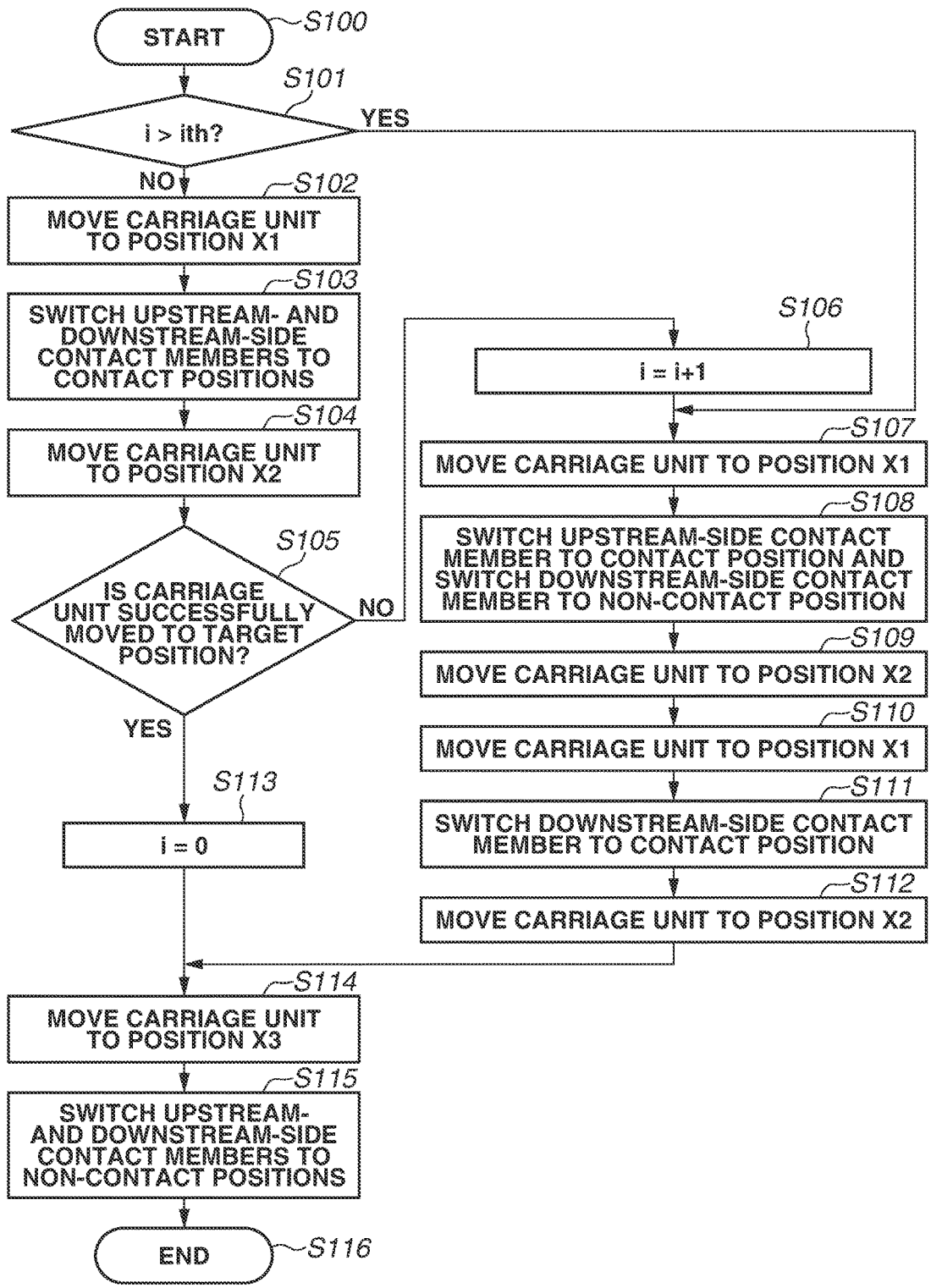

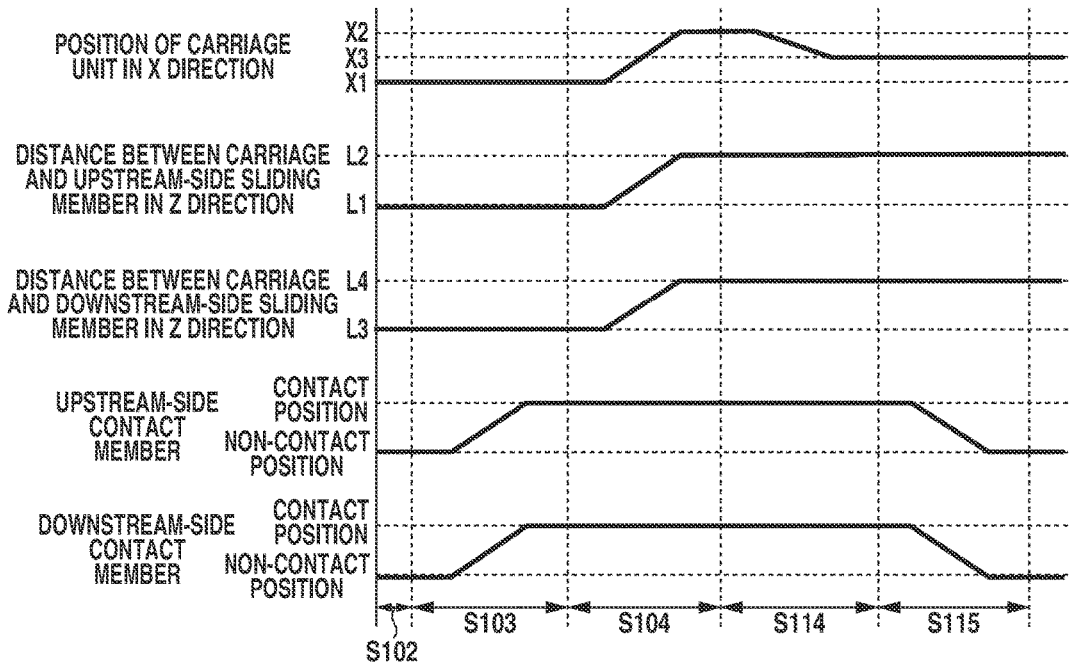
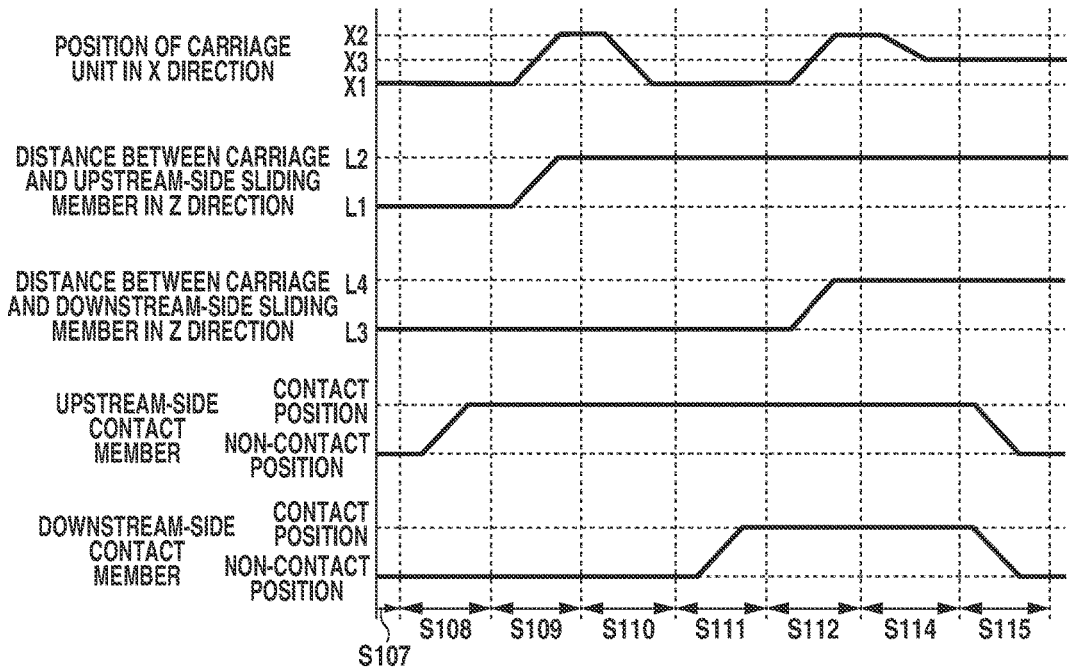

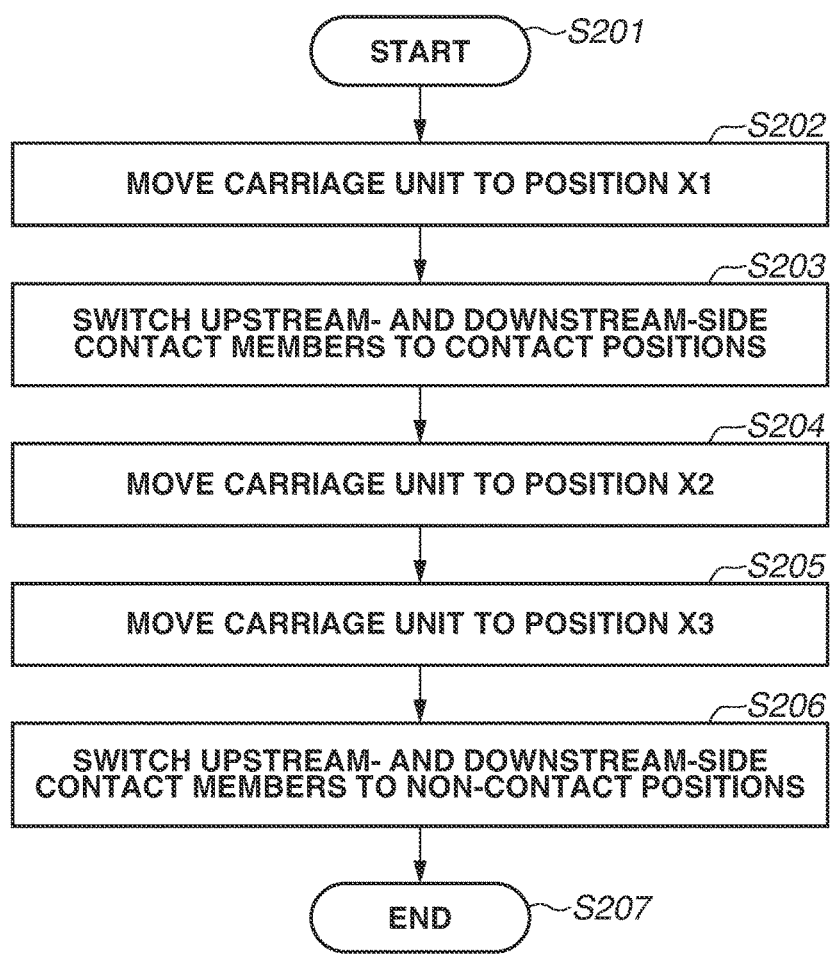

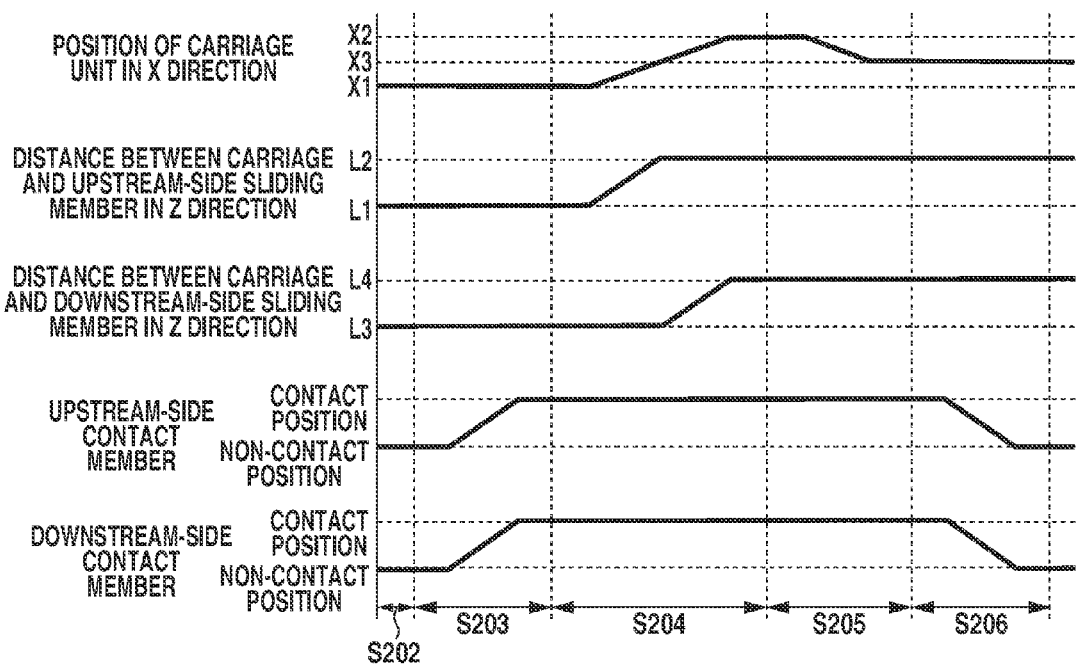

CARRIAGE DEVICE

BACKGROUND OF THE INVENTION

Field of the Invention

The present disclosure relates to a carriage device which reciprocates with a head mounted thereon.

Description of the Related Art

Japanese Patent Application Laid-Open No. 2007-144766 discusses a recording apparatus of serial scanning type. This recording apparatus includes a carriage which is held on a pair of guide rails, and gap adjustment members which change a relative height between a head mounted on the carriage and the guide rails. The gap adjustment members protrude from both ends of the carriage in a scanning direction. The carriage reciprocates to bring end portions of the gap adjustment members into contact with predetermined contact portions, whereby slide positions of the gap adjustment members are adjusted. A distance (head height) between the head mounted on the carriage and a sheet can thus be adjusted.

In the recording apparatus discussed in Japanese Patent Application Laid-Open No. 2007-144766, the gap adjustment members arranged on the pair of respective guide rails are simultaneously slid to adjust the height of the head while maintaining the carriage horizontal. However, if the gap adjustment members do not slide easily due to reasons such as a secular change in clearance between members and adhesion of grease, the driving load of the carriage for a gap adjustment increases. A driving system for moving the carriage can then malfunction due to an overload.

SUMMARY OF THE INVENTION

The present disclosure is directed to providing a carriage device which can reduce a driving load when adjusting the height of a head through movement of a carriage.

According to an aspect of the present disclosure, a carriage device includes a carriage configured to reciprocate in a first direction, a head being mounted on the carriage, a first guide member and a second guide member configured to guide movement of the carriage in the first direction, the first and second guide members supporting the carriage at positions separate from each other in a second direction crossing the first direction, a first adjustment unit configured to adjust a height of the carriage relative to the first guide member through the movement of the carriage, and a second adjustment unit configured to adjust a height of the carriage relative to the second guide member through the movement of the carriage, the carriage device being capable of sequentially performing a first operation of changing the height of the carriage by the first adjustment unit and a second operation of changing the height of the carriage by the second adjustment unit.

Further features of the present disclosure will become apparent from the following description of exemplary embodiments with reference to the attached drawings.

BRIEF DESCRIPTION OF THE DRAWINGS

FIG. 8 is a flowchart illustrating a gap switching operation according to the first exemplary embodiment.

FIGS. 9A and 9B are diagrams illustrating state transitions of a carriage unit according to the first exemplary embodiment.

FIG. 10 is a flowchart illustrating a gap switching operation according to a second exemplary embodiment.

FIG. 11 is a diagram illustrating state transitions of the carriage unit according to the second exemplary embodiment.

DESCRIPTION OF THE EMBODIMENTS

Exemplary embodiments of the present disclosure will be described with reference to the drawings.

Figure 1:
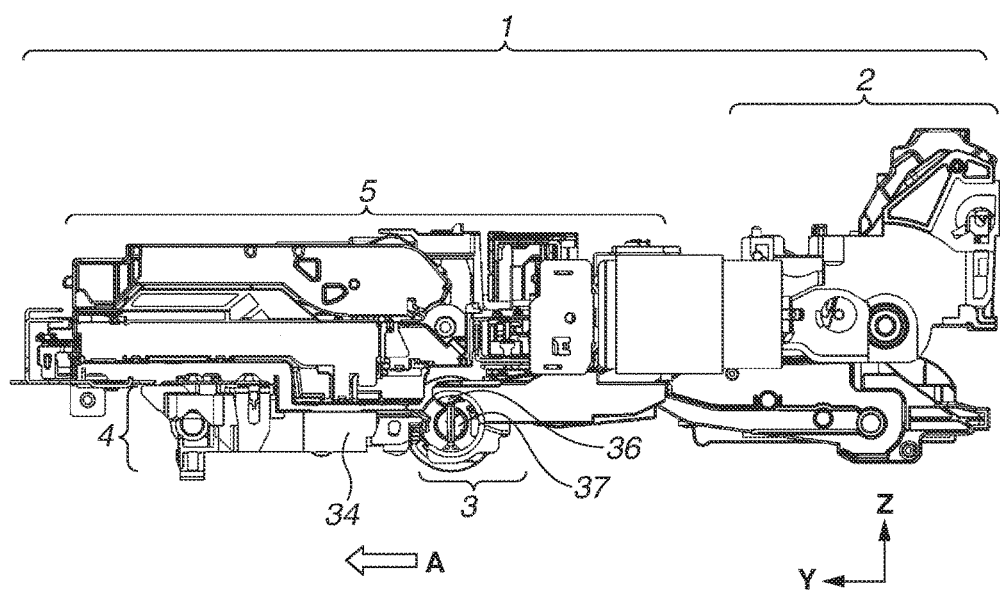
FIG. 1 is a diagram illustrating a recording apparatus according to a first exemplary embodiment.
Figure 2A:
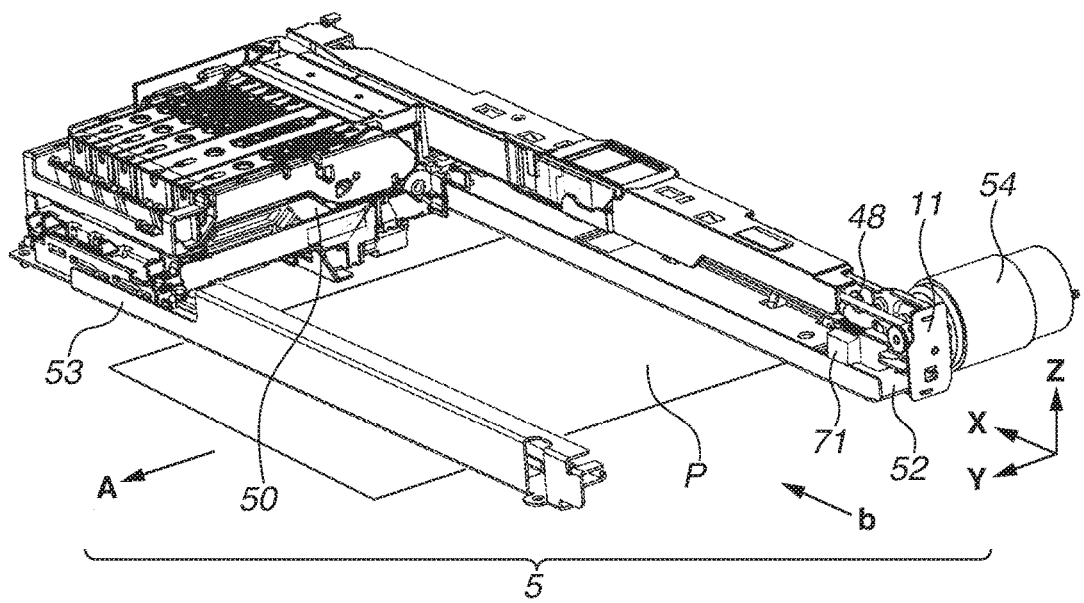
FIGS. 2A and 2B are diagrams illustrating a recording unit of the recording apparatus according to the first exemplary embodiment.
Figure 2B:
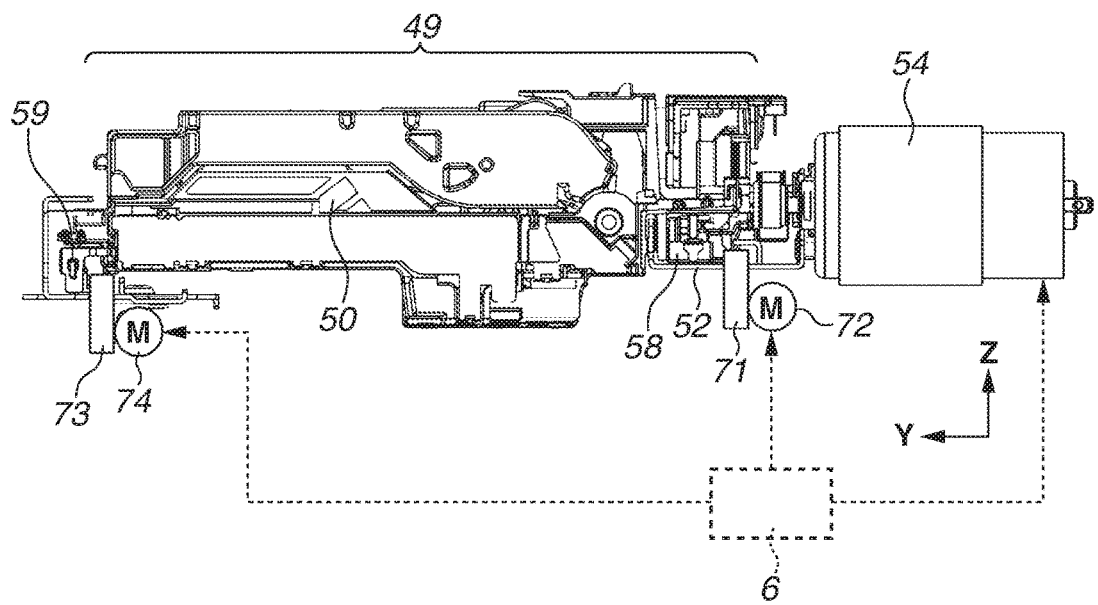
Figure 3A:
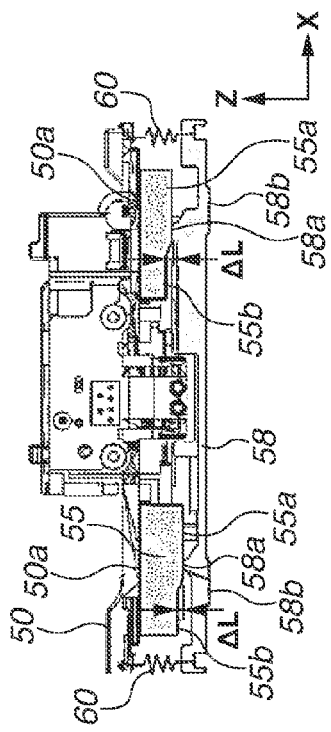
FIGS. 3A, 3B, 3C, and 3D are diagrams regarding a mechanism for gap switching.
Figure 3B:
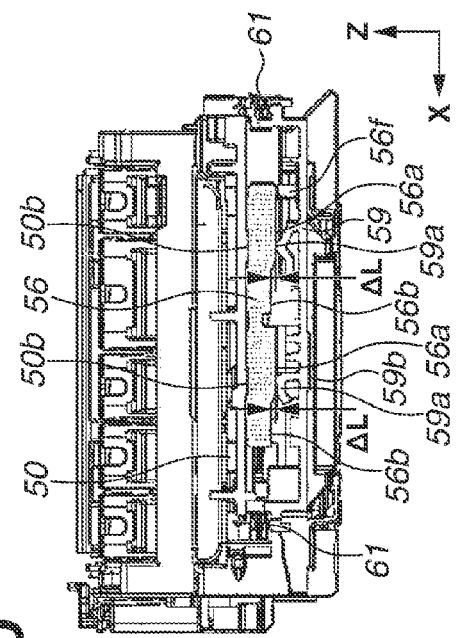
Figure 3C:
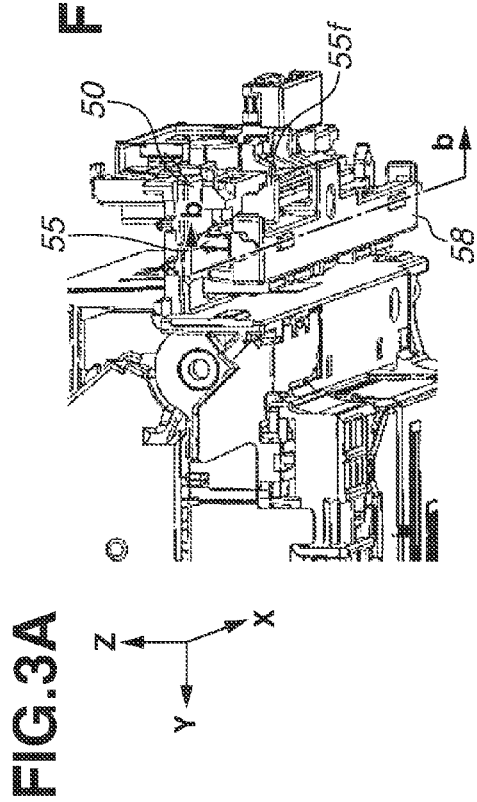
Figure 3D:
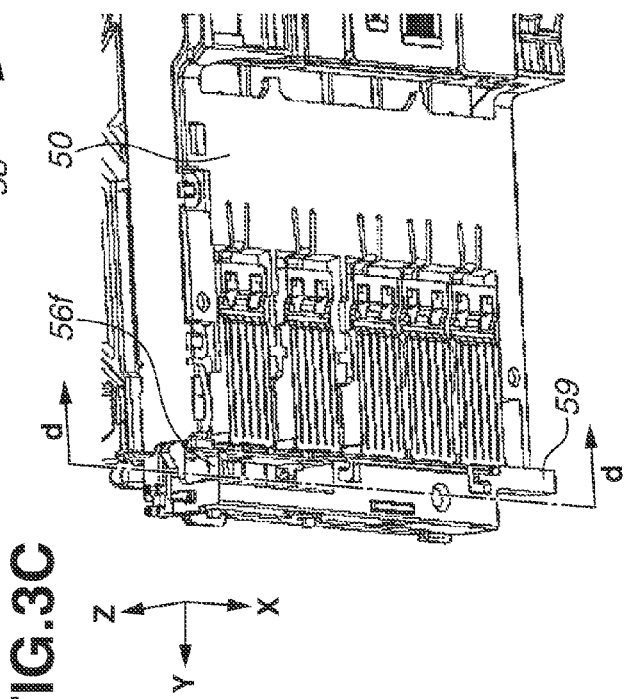

FIG. 1 is a side view of a recording apparatus according to a first exemplary embodiment, including a carriage device according to an exemplary embodiment. This recording apparatus 1 includes, or is broadly divided into, a sheet feed unit 2, a conveyance unit 3, a sheet discharge unit 4, a recording unit 5, and a control unit 6 (see FIG. 2B). The recording unit 5 performs recording by discharging a liquid to a sheet P which is a recording medium. The sheet feed unit 2 stores sheets P to be recorded, and sends out a sheet P to a platen 34 which is opposed to the recording unit 5 and supports the sheet P during recording. The conveyance unit 3 conveys the sheet P from the sheet feed unit 2 toward the platen 34. The sheet discharge unit 4 discharges the recorded sheet P to the outside of the recording apparatus 1. In the following description, a conveyance direction of the sheet P (direction indicated by the arrow A in the diagram) will be referred to as a Y direction. A direction that is orthogonal to the Y direction and parallel to a scanning direction of a carriage 50 will be referred to as an X direction. A direction perpendicular to the X and Y directions will be referred to as a Z direction. The Z direction coincides with a normal to the surface of the sheet P in a position where the recording unit 5 performs recording. FIGS. 2A and 2B illustrate the recording unit 5 according to the first exemplary embodiment. FIG. 2A is a perspective view. FIG. 2B is a view seen in the direction of the arrow b in FIG. 2A. In FIG. 2B, a chassis 11 is omitted. The recording unit 5 includes a carriage unit 49. The carriage unit 49 includes a carriage 50. A head 7 (also referred to as a liquid discharge head or a recording head) for discharging a liquid such as ink and a treatment liquid by an inkjet method is attached to the carriage 50. The carriage 50 functions as a carriage for holding the head 7. FIG. 3A is a view of a vicinity of a sliding member 58 upstream of the carriage unit 49 as seen up from obliquely below. FIG. 3B is an end view taken along a line b-b in FIG. 3A. FIG. 3C is a view of a vicinity of a sliding member 59 downstream of the carriage unit 49 as seen up from obliquely below. FIG. 3D is an end view taken along a line d-d in FIG. 3C.

Referring to FIGS. 1 to 3D, a configuration of the recording apparatus 1 according to the first exemplary embodiment will be described. A sheet P is conveyed in the direction of the arrow A (sub scanning direction, conveyance direction) from the sheet feed unit 2, and conveyed over the platen 34 in FIG. 1 along the platen 34. The recording unit 5 moves the carriage 50 to scan and reciprocate along a direction (main scanning direction) crossing the conveyance direction A. To support the moving carriage 50 at two positions, an upstream-side guide rail 52 and a downstream-side guide rail 53 are fixed to the recording apparatus 1 with the platen 34 therebetween. In the illustrated example, the reciprocating direction (first direction) is parallel to the surface of the sheet P and orthogonal to the conveyance direction A (second direction). The pair of guide rails 52 and 53 (first guide member and second guide member) for guiding the carriage 50 are arranged in parallel, at a distance from each other in the conveyance direction A. Both the guide rails 52 and 53 extend in the reciprocating direction of the carriage, orthogonal to the conveyance direction A. The upstream-side guide rail 52 has an L shape.

An upstream and downstream are defined in terms of the conveyance direction A of the sheet P. As seen from the position of the platen 34, the conveyance unit 3 is on the upstream side, and the sheet discharge unit 4 is on the downstream side. To stabilize the orientation of the carriage 50 with respect to the sub scanning direction, the upstream-side member 58 sliding on the upstream-side guide rail 52 and the downstream-side member 59 sliding on the downstream-side guide rail 53 are attached to the carriage 50. The sliding members 58 and 59 are first and second sliding members, which are integrated with the carriage 50 and are arranged to be movable with respect to the carriage 50 in a direction (third direction, Z direction) orthogonal to the surface of the sheet P which is conveyed to a position opposite to the carriage 50. The sliding members 58 and 59 can be adjusted to change a distance from the head 7 to the surface of the sheet P. The distance from the head 7 to the surface of the sheet P is referred to as a gap. A biasing member for biasing the carriage 50 in the −Y direction is arranged on the carriage 50. The upstream-side guide rail 52 is sandwiched between the carriage 50 and the biasing member by the biasing force of the biasing member, whereby the orientation of the carriage 50 is stabilized. In the ±Z directions, i.e., vertical direction in the diagrams, the carriage 50 makes contact with the L-shaped guide rail 52 under its own weight via the upstream-side sliding member 58, and with the guide rail 53 via the downstream-side sliding member 59. The weight of the carriage 50 is thereby supported in a distributed manner at two widely separated positions.

The upstream-side guide rail 52 is attached to the chassis 11. The carriage 50 is driven by a carriage motor 54 attached to the chassis 11, via a timing belt 48. The carriage motor 54 is a scanning unit. As illustrated in FIG. 2B, the carriage motor 54 is controlled and driven by the control unit 6. To detect the position of the carriage 50, a code strip marked at a line density of 150 to 300 lines per 25.4 mm (one inch) is arranged in parallel with the timing belt 48. The carriage 50 includes an encoder sensor for reading the code strip. A detection result from the encoder sensor is supplied to the control unit 6.

In the foregoing configuration, in performing recording by discharging the liquid to a sheet P, a pair of rollers 36 and 37 (see FIG. 1) conveys the sheet P to a row position to perform recording (position of the sheet P along the sub scanning direction). Meanwhile, the carriage motor 54 moves the carriage 50 to a column position to perform recording (position of the sheet P along the reciprocating direction) so that the head 7 is opposed to the recording position. The head 7 then discharges the liquid such as a recording liquid toward the sheet P according to a signal from the control unit 6, whereby recording is performed.

A contact member 71 for making contact with an upstream-side adjustment member 55 to be described below is arranged in a scanning range of the carriage unit 49 on the upstream-side guide rail 52. The contact member 71 can be moved by a driving source 72 in the Z direction in the diagrams to switch between a position making contact with and a position making no contact with the adjustment member 55. Similarly, a contact member 73 for making contact with a downstream-side adjustment member 56 to be described below is arranged in a scanning range of the carriage unit 49 on the downstream-side guide rail 53. The contact member 73 can be moved by a driving source 74 in the Z direction in the diagrams. The contact member 73 can thus switch between a position in which the contact member 73 protrudes to make contact with the adjustment member 56 and a position in which the contact member 73 is retracted not to make contact with the adjustment member 56. The driving sources 72 and 74 include a linear actuator. The driving sources 72 and 74 are controlled and driven by the control unit 6.

Next, a specific configuration for switching the gap between the head 7 and the sheet P by the sliding members 58 and 59 will be described with reference to FIGS. 3A to 3D. In FIGS. 3A to 3D, the upstream- and downstream-side adjustment members 55 and 56 are illustrated with halftone dots for the sake of emphasis. The upstream-side sliding member 58 is latched through positioning so that the sliding member 58 can move with respect to the carriage 50 only in the Z direction in the diagrams. The sliding member 58 includes a sliding portion 58b which abuts on the upstream-side guide rail 52 in the Z direction under the weight of the carriage unit 49. When the carriage unit 49 scans in the X direction, the sliding portion 58b slides over the guide rail 52. The upstream-side adjustment member 55 is latched through positioning so that the adjustment member 55 can move between the sliding member 58 and the carriage 50 only in the Y direction. The sliding member 58 is pressed against the carriage 50 in the +Z direction by a pressing member 60 such as a spring. The sliding member 58 includes an abutting portion 58a which abuts on an abutting portion 55a on the adjustment member 55. The adjustment member 55 is pressed in the +Z direction by the pressing member 60 via the sliding member 58 and abuts on an abutting surface 50a of the carriage 50. If the adjustment member 55 moves in the +X direction, the surface on which the abutting portion 58a of the sliding member 58 abuts in the adjustment member 55, changes from the abutting portion 55a to the abutting portion 55b. The abutting portions 55a and 55b both are surfaces perpendicular to the Z direction. The distance between the abutting portions 55a and 55b in the Z direction is set to ΔL. If the surface on which the abutting portion 58a of the sliding member 58 abuts, thus changes, the distance between the sliding member 58b and the abutting surface 50a of the carriage 50 in the Z direction decreases by ΔL.

A protrusion 55f protruding in the −Y direction is formed on the upstream-side adjustment member 55 so that the protrusion 55f can abut on and make contact with the protruded contact member 71 when the carriage unit 49 scans 49 in the X direction. If the protrusion 55f abuts on the contact member 71 during the scanning of the carriage unit in the X direction, a relative position of the adjustment member 55 with respect to the sliding member 58 in the X direction changes. In such a manner, the surface on which the abutting portion 58a of the sliding member 58 abuts, can transition between the abutting portions 55a and 55b.

Similarly, the downstream-side sliding member 59 is latched by positioning so that the sliding member 59 can move relative to the carriage 50 only in the Z direction in the diagrams. The sliding member 59 includes a sliding portion 59b which abuts on the downstream-side guide rail 53 in the Z direction under the weight of the carriage unit 49. When the carriage unit 49 scans in the X direction, the sliding portion 59b slides over the guide rail 53. The downstream-side adjustment member 56 is latched through positioning so that the adjustment member 56 can move between the sliding member 59 and the carriage 50 only in the Y direction. The sliding member 59 is pressed against the carriage 50 in the +Z direction by a pressing member 61 such as a spring. The sliding member 59 includes an abutting portion 59a which abuts on an abutting portion 56a on the adjustment member 56. The adjustment member 56 is pressed in the +Z direction by the pressing member 61 via the sliding member 59 and abuts on an abutting surface 50b of the carriage 50. If the adjustment member 56 moves in the +X direction, the surface on which the abutting portion 59a of the sliding member 59 abuts in the adjustment member 56, changes from the abutting portion 56a to the abutting portion 56b. The abutting portions 56a and 56b both are surfaces perpendicular to the Z direction. The distance between the abutting portions 56a and 56b in the Z direction is also set to ΔL. If the surface on which the abutting portion 59a of the sliding member 59 abuts, thus changes, the distance between the sliding member 59b and the abutting surface 50b of the carriage 50 decreases in the Z direction by ΔL. A protrusion 56f protruding in the −Y direction is formed on the downstream-side adjustment member 56 so that the protrusion 56f can abut on and make contact with the protruded contact member 73 when the carriage unit 49 scans in the X direction. If the protrusion 56f abuts on the contact member 73 during the scanning of the carriage unit 49 in the X direction, a relative position of the adjustment member 56 with respect to the sliding member 59 in the X direction changes. In such a manner, the surface on which the abutting portion 59a of the sliding member 59 abuts, can transition between the abutting portions 56a and 56b.

The adjustment members 55 and 56 include a plurality of abutting surfaces, and adjust the distance between the head 7 and the sheet P by transitions between the plurality of abutting surfaces. In the foregoing description, the adjustment members 55 and 56 each include two stages of abutting portions 55a and 55b, or 56a and 56b. However, the number of stages of abutting portions may be increased to enable finer gap adjustments.

Figure 4A:
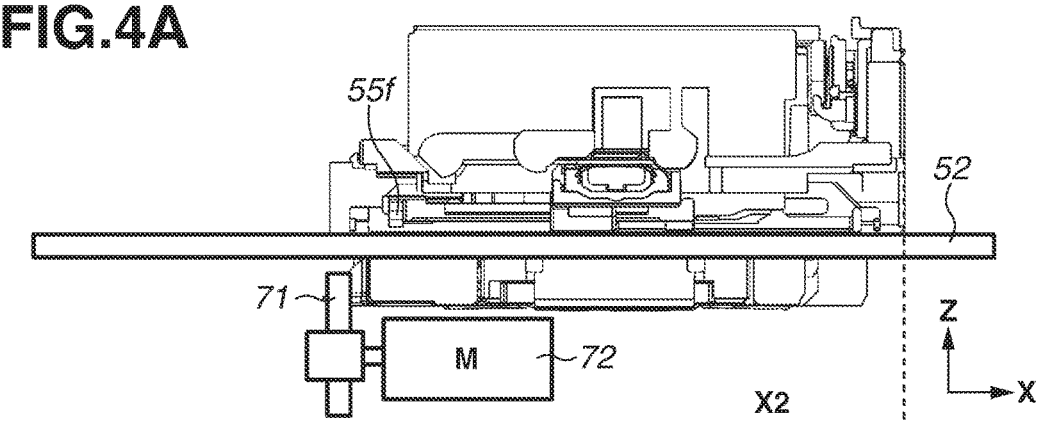
FIGS. 4A, 4B, and 4C are diagrams regarding a gap switching operation on an upstream side.
Figure 4B:
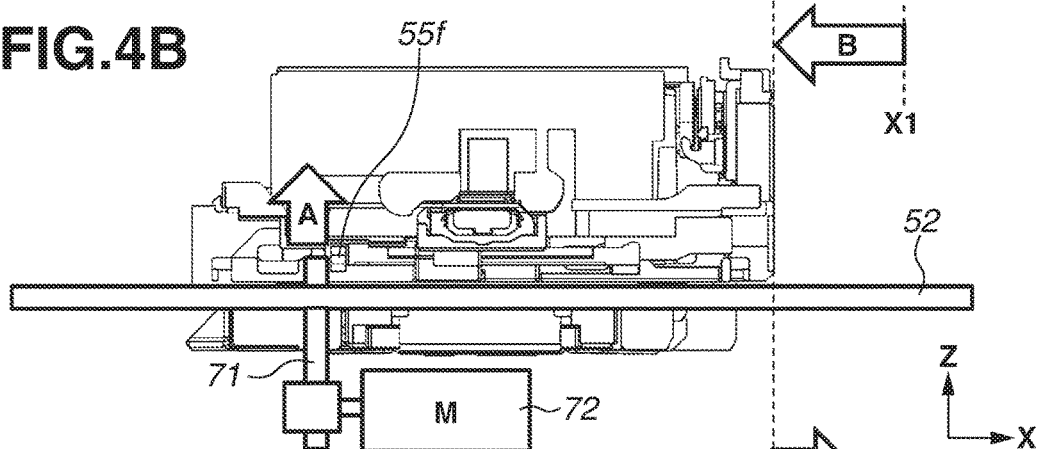
Figure 4C:
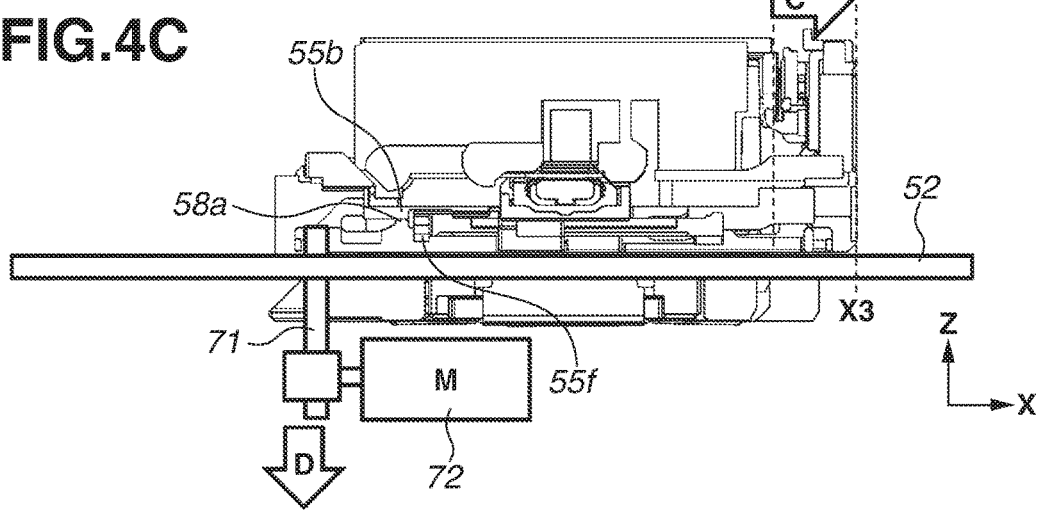

Next, control for switching the gap will be described with reference to 4A to 7C. FIGS. 4A, 4B, and 4C illustrate the control when the surface on which the upstream-side sliding member 58 abuts in the upstream-side adjustment member 55, is switched from the abutting portion 55a to the abutting portion 55b to draw the head 7 away from the sheet P. FIG. 4A illustrates a state in which the carriage unit 49 is in a gap switching preparation position. The position of the carriage unit 49 will be represented by a coordinate in the X direction. The carriage unit 49 is in a position X1 in this case. The contact member 71 is in a retracted state. Next, as illustrated in FIG. 4B, the driving source 72 is driven to move and protrude the contact member 71 in an A direction in the diagram, whereby the contact member 71 is switched to a contact position. Contact positions refer to positions of the contact members 71 and 73 such that the protrusions 55f and 56f of the adjustment members 55 and 56 make contact with the contact members 71 and 73, respectively, during the scanning of the carriage unit 49. Positions of the contact members 71 and 73 where the protrusions 55f and 56f of the adjustment members 55 and 56 do not make contact with the contact members 71 and 73 during the scanning of the carriage unit 49 will be referred to as non-contact positions. After the contact member 71 is switched to the contact position, the carriage unit 49 performs scanning to make movement in a B direction in the diagram until the carriage unit 49 reaches a position X2. As the carriage unit 49 moves to the position X2, the protrusion 55f comes into contact with the contact member 71, whereby the surface on which the abutting portion 58a of the upstream-side sliding member 58 abuts, transitions from the abutting portion 55a to the abutting portion 55b of the adjustment member 55. This increases the distance between the carriage 50 and the upstream-side sliding member 58. As illustrated in FIG. 4C, the carriage unit 49 is then moved in a C direction in the diagram, which is opposite from the B direction, until the carriage unit 49 reaches a position X3. Finally, the driving source 72 retracts the contact member 71 in a D direction in the diagram, whereby the contact member 71 is switched to the non-contact position.

Figure 5A:
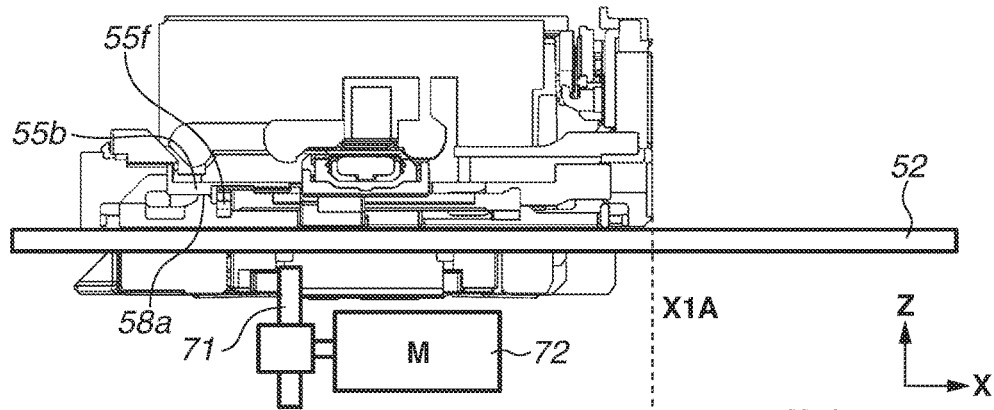
FIGS. 5A, 5B, and 5C are diagrams regarding a gap switching operation on the upstream side.
Figure 5B:
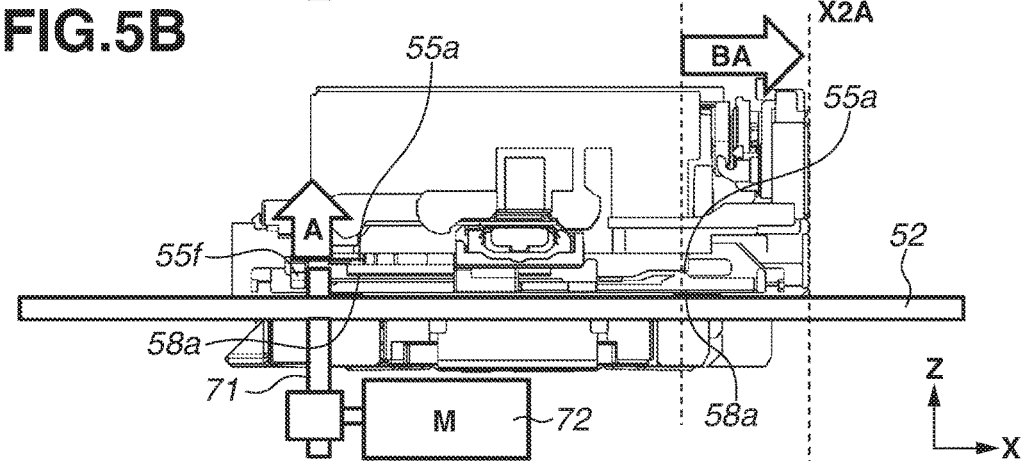
Figure 5C:
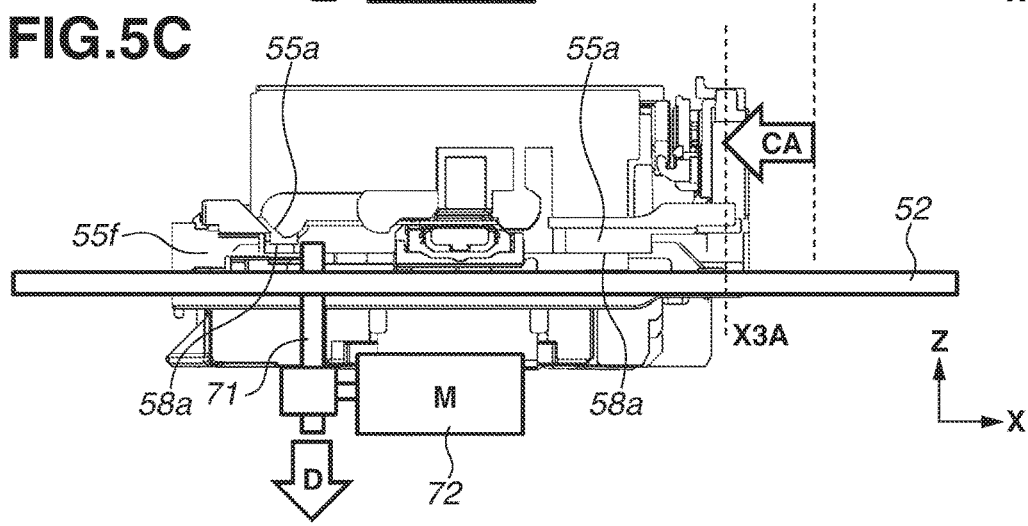

FIGS. 5A, 5B, and 5C illustrate control when the surface on which the upstream-side sliding member 58 abuts in the adjustment member 55, is switched from the abutting portion 55b to the abutting portion 55a to bring the head 7 closer to the sheet P. FIG. 5A illustrates the carriage unit 49 in a gap switching preparation position. The carriage unit 49 is in a position X1A in this case. The contact member 71 is in the non-contact position. As illustrated in FIG. 5B, the driving source 72 is then driven to move the contact member 71 in the A direction in the diagram, whereby the contact member 71 is switched to the contact position. The carriage unit 49 then performs scanning in a BA direction in the diagram and moves to a position X2A. As the carriage unit 49 moves to the position X2A, the protrusion 55f comes into contact with the contact member 71. The surface on which the abutting portion 58a of the sliding member 58 abuts, thus transitions from the abutting portion 55b to the abutting portion 55a, and the distance between the carriage 50 and the sliding member 58 decreases. As illustrated in FIG. 5C, the carriage unit 49 is then moved in a CA direction in the diagram until the carriage unit 49 reaches a position X3A. The driving source 72 moves the contact member 71 in the D direction in the diagram, whereby the contact member 71 is switched to the non-contact position.

Figure 6A:
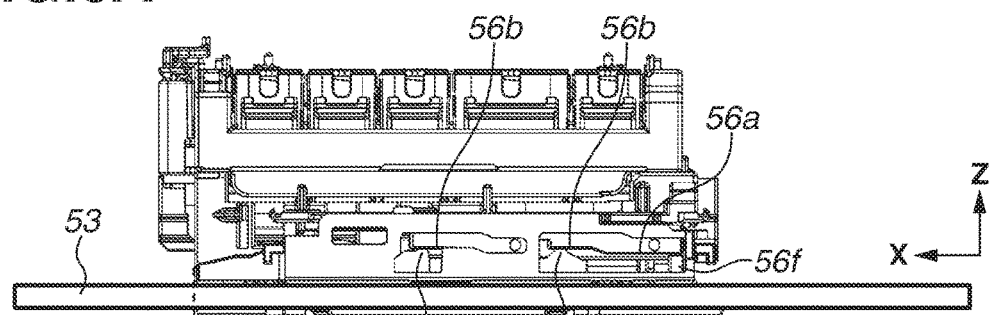
FIGS. 6A, 6B, and 6C are diagrams regarding a gap switching operation on a downstream side.
Figure 6B:
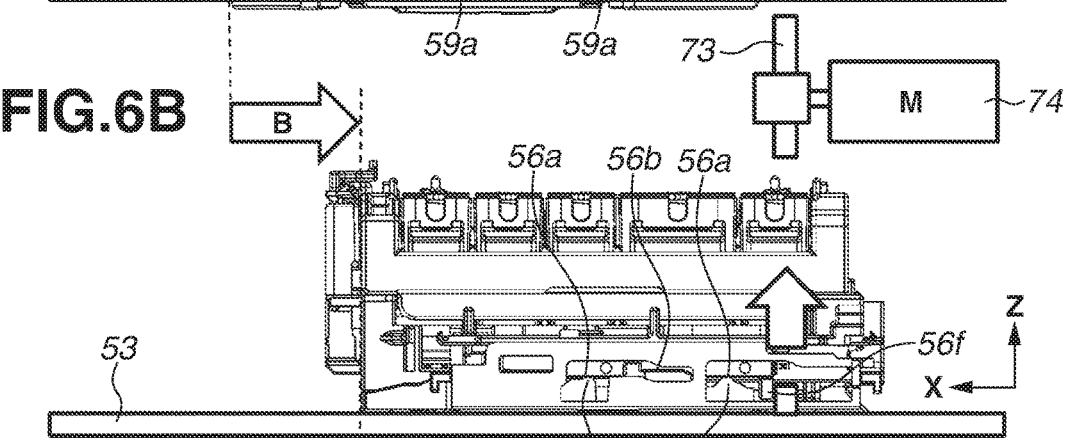
Figure 6C:
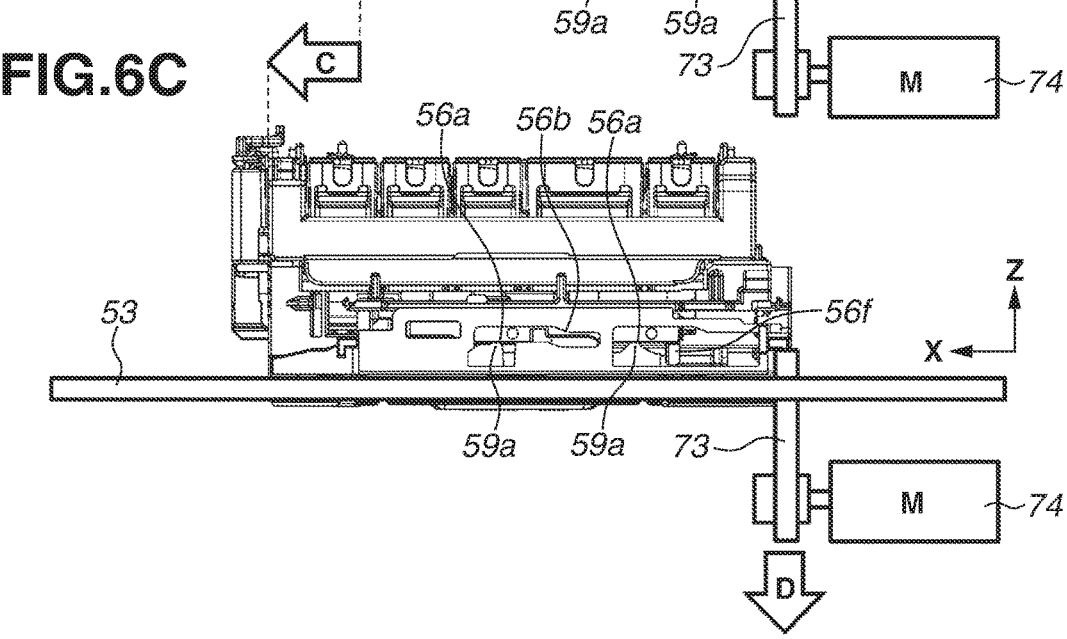

FIGS. 6A, 6B, and 6C illustrate control when the surface on which the downstream-side sliding member 59 abuts in the downstream-side adjustment member 56, is switched from the abutting portion 56a to the abutting portion 56b to draw the head 7 away from the sheet P. Like FIG. 4A, FIG. 6A illustrates the carriage unit 49 in the position X1 which is a gap switching preparation position. The contact member 73 is in the non-contact position in this case. As illustrated in FIG. 6B, the driving source 74 is then driven to move the contact member 73 in the A direction in the diagram, whereby contact member 73 is switched to the contact position. The carriage unit 49 then performs scanning in the B direction in the diagram until the carriage unit 49 moves to the position X2. As the carriage unit 49 moves to the position X2, the protrusion 56f of the adjustment member 56 comes into contact with the contact member 73. The surface on which the abutting portion 59a of the sliding member 59 abuts, transitions from the abutting portion 56a to the abutting portion 56b. This increases the distance between the carriage 50 and the downstream-side sliding member 59. As illustrated in FIG. 6C, the carriage unit 49 is then moved in the C direction in the diagram until the carriage unit 49 reaches the position X3. Finally, the driving source 72 retracts the contact member 71 in the D direction in the diagram, whereby the contact member 71 is switched to the non-contact position.

Figure 7A:
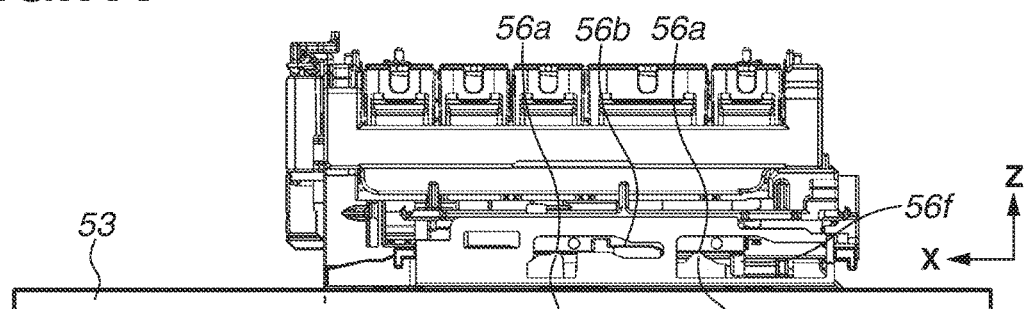
FIGS. 7A, 7B, and 7C are diagrams regarding a gap switching operation on the downstream side.
Figure 7B:
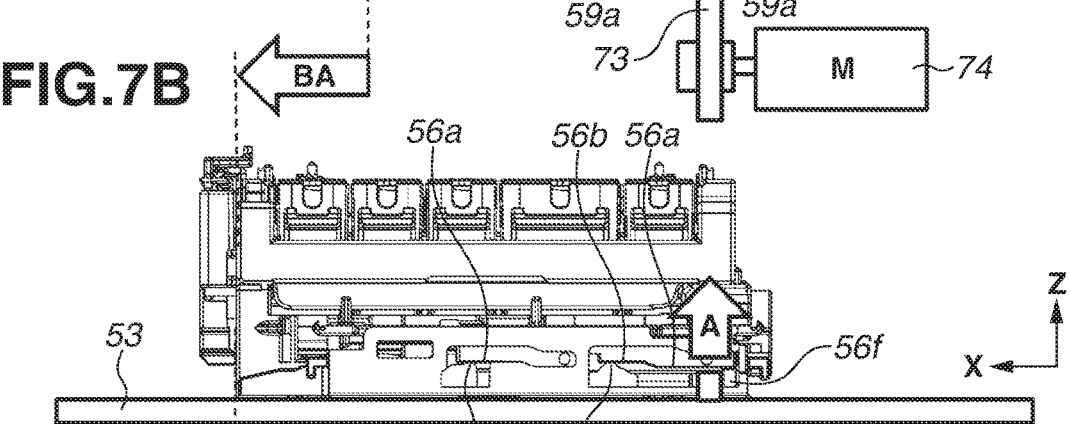
Figure 7C:
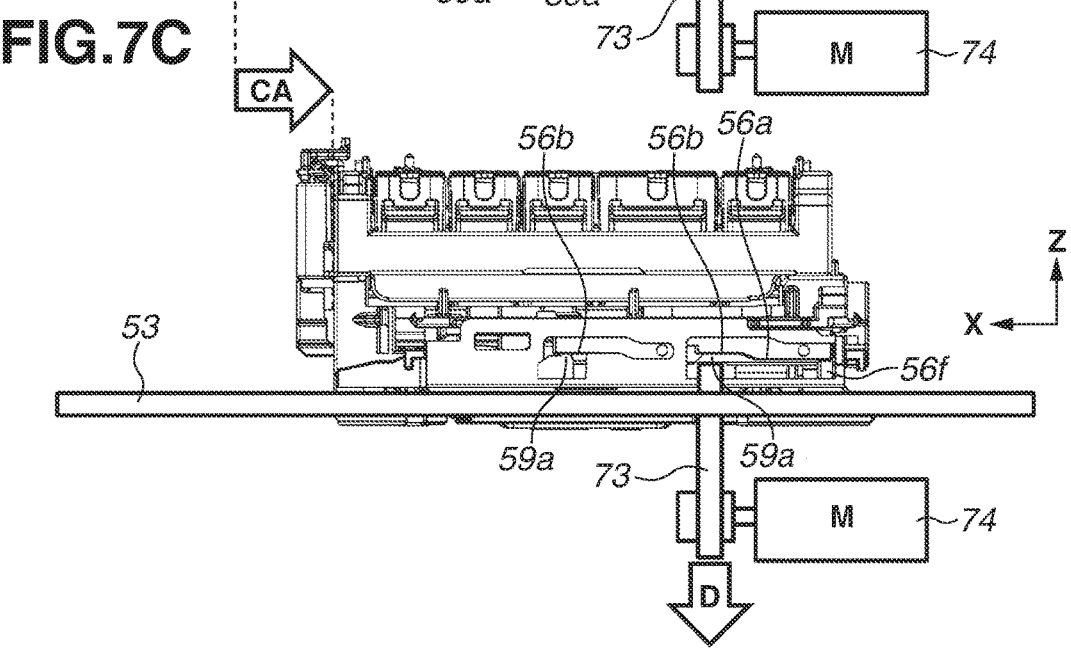

FIGS. 7A, 7B, and 7C illustrate control when the surface on which the downstream-side sliding member 59 abuts in the adjustment member 56, is switched from the abutting portion 56b to the abutting portion 56a to bring the head 7 closer to the sheet P. FIG. 7A illustrates the carriage unit 49 in the position X1A which is a gap switching preparation position. The contact member 73 is in the non-contact position. As illustrated in FIG. 7B, the driving source 74 is then driven to move the contact member 73 in the A direction in the diagram, whereby the contact member 73 is switched to the contact position. The carriage unit 49 is then scanned in the BA direction in the diagram until the carriage unit 49 moves to the position X2A. As the carriage unit 49 moves to the position X2A, the protrusion 56f comes into contact with the contact member 73. The surface on which the abutting portion 59a of the sliding member 59 abuts, thus transitions from the abutting portion 56b to the abutting portion 56a. The distance between the carriage 50 and the sliding member 59 decreases. As illustrated in FIG. 7C, the carriage unit 49 is then moved in the CA direction in the diagram until the carriage unit 49 reaches the position X3A. The driving source 74 moves the contact member 73 in the D direction in the diagram, whereby the contact member 73 is switched to the non-contact position.

In the recording apparatus 1, as the carriage unit 49 moves from the position X1 to the position X2, the upstream- and downstream-side adjustment members 55 and 56 can be slid in the +X direction, depending on whether the contact members 71 and 73 are in the contact position or the non-contact position. As the carriage unit 49 moves from the position X1A to the position X2A, the adjustment members 55 and 56 can be slid in the −X direction, depending on whether the respective contact members 71 and 73 are in the contact position or the non-contact position. In other words, the upstream- and downstream-side adjustment members 55 and 56 can be individually adjusted according to the scanning of the carriage unit 49. By such slide operations, the adjustment members 55 and 56 move relative to the carriage 50 in the X direction. To maintain the head 7 positioned in parallel to the sheet P, both the adjustment members 55 and 56 need to be adjusted. The two adjustment members 55 and 56 do not need to be adjusted exactly simultaneously, and may be adjusted with a time lag.

During an extended period of use of the recording apparatus 1, the slide operations of the adjustment members 55 and 56 can become less smooth due to such reasons as a secular change in clearance between members, adhesion of grease, and running out of grease. In such a case, the driving load of the carriage unit 49 in making the slide operations increases compared to the original level. In addition, the sliding load when the carriage unit 49 supported by the two guides moves may increase as well, in which case the driving load of the carriage unit 49 also increases compared to the original level. As a result, malfunctions such as a servo error of the carriage driving system can occur. If the driving load of the carriage unit 49 increases beyond expectation, the upstream- and downstream-side adjustment members 55 and 56 are sequentially adjusted at the different points, not simultaneously. The driving load of the carriage unit 49 resulting from the slide movement is thus distributed. On the other hand, if the driving load of the carriage unit 49 is within expectations, the upstream- and downstream-side adjustment members 55 and 56 are simultaneously adjusted to reduce the gap adjustment time.

FIG. 8 is a flowchart illustrating a procedure of such gap switching. FIGS. 9A and 9B illustrate state transitions corresponding to the procedure illustrated in FIG. 8. While a procedure of gap switching for drawing the head 7 away from the sheet P is described here, it can also be easily understood from the foregoing description of FIGS. 4A to 7C that the head 7 can be brought closer to the sheet P by a similar gap switching procedure. The horizontal axes of FIGS. 9A and 9B indicate time. FIGS. 9A and 9B illustrate, from top to bottom, the position of the carriage unit 49 in the X direction, the distance between the carriage 50 and the upstream-side sliding member 58, the distance between the carriage 50 and the downstream-side sliding member 59, the position of the upstream-side contact member 71, and the position of the downstream-side contact member 73. The symbols that accompany the arrows in FIGS. 9A and 9B coincide with ones representing respective stages of the procedure illustrated in FIG. 8. The procedure described here is executed by the control unit 6.

In step S100, the processing starts. In step S101, the control unit 6 initially determines whether the number of consecutive retries i is greater than a predetermined value ith. If i>ith (YES in step S101), the processing proceeds to step S107. If i≤ith (NO in step S101), the processing proceeds to step S102. The determination of step S101 is made not to execute the processing of steps S102 to S104 in the subsequent processing if, as will be described below, situations in which a predetermined displacement is not obtained (i.e., a retry is made) occur consecutively a predetermined number of times. In step S102, the control unit 6 makes the carriage unit 49 scan in the X direction so that carriage unit 49 moves to the gap switching preparation position X1. In step S103, the control unit 6 switches both the upstream- and downstream-side contact members 71 and 73 to the contact positions. In step S104, the control unit 6 drives the carriage unit 49 so that the carriage unit 49 moves to the position X2 which is a gap switching end position. The movement of the carriage unit 49 in the X direction toward the position X2 brings the protrusion 55f of the upstream-side adjustment member 55 into contact with the contact member 71. The distance between the carriage 50 and the upstream-side sliding member 58 in the Z direction switches from L1 to L2, i.e., changes by ΔL. Similarly, the movement of the carriage unit 49 in the X direction also brings the protrusion 56f of the downstream-side adjustment member 56 into contact with the contact member 73. The distance between the carriage 50 and the downstream-side sliding member 59 in the Z direction switches from L3 to L4, i.e., changes by ΔL. As illustrated in FIG. 9A, the distance from the upstream-side sliding member 58 and the distance from the downstream-side sliding member 59 are switched almost simultaneously by the same amount ΔL. The carriage 50 can thus be maintained substantially horizontal while the gap is changed by ΔL.

In step S104, the adjustment members 55 and 56 are simultaneously slid in the X direction. However, if the driving load of the carriage unit 49 increases due to a secular change, the carriage unit 49 may fail to move to the target position (here, position X2). In step S105 subsequent to step S104, the control unit 6 then determines whether the carriage unit 49 is successfully moved to the position X2. Such a determination is made to judge whether the sliding members 58 and 59 have successfully made a desired displacement in the Z direction. If the carriage unit 49 has successfully moved to the position X2 (YES in step S105), the processing proceeds to step S113 since the gap is normally switched. In step S113, the control unit 6 substitutes 0 into the value of the number of consecutive retries i. The processing proceeds to step S114. In step S114, as described with reference to FIGS. 4C and 6C, the control unit 6 moves the carriage unit 49 to the position X3 where the carriage unit 49 is separated from the contact members 71 and 73. In step S115, the control unit 6 switches both the contact members 71 and 73 to the non-contact positions. In step S116, the processing ends. FIG. 9A illustrates state transitions when it is determined that the carriage unit 49 has successfully moved to the position X2, which is a gap switching end position, in step S105.

In step S105, if it is determined that the carriage unit 49 has not successfully moved to the position X2 (NO in step S105), the processing proceeds to step S106. In step S106, the control unit 6 increments the number of consecutive retries i by 1. In step S107, the control unit 6 moves the carriage unit 49 to the gap switching preparation position X1. In step S108, the control unit 6 switches the upstream-side contact member 71 to the contact position, and switches the downstream-side contact member 73 to the non-contact position. In step S109, in such a state, the control unit 6 moves the carriage unit 49 to the position X2. In the process of movement, the protrusion 55f of the upstream-side adjustment member 55 makes contact with the contact member 71 while the protrusion 56f of the downstream-side adjustment member 56 does not make contact with the contact member 73. The movement of the carriage unit 49 in the X direction thus switches the distance between the carriage 50 and the upstream-side sliding member 58 in the Z direction from L1 to L2, i.e., changes the distance by ΔL. Meanwhile, the distance between the carriage 50 and the downstream-side sliding member 59 in the Z direction remains unchanged. In step S110, the control unit 6 moves the carriage unit 49 to the gap switching preparation position X1. In step S111, the control unit 6 switches the downstream-side contact member 73 to the contact position. In step S112, in such a state, the control unit 6 moves the carriage unit 49 to the position X2 in the X direction. Since the upstream-side adjustment member 55 has already been slid, the protrusion 55f of the upstream-side adjustment member 55 does not make contact with the contact member 71 in the process of movement. The protrusion 56f of the downstream-side adjustment member 56 makes contact with the contact member 73 to slide the adjustment member 56. This switches the distance between the carriage 50 and the downstream-side sliding member 59 in the Z direction from L3 to L4, i.e., changes the distance by ΔL. As is the case when it is determined that the carriage unit 49 has successfully moved to the position X2 in step S105, the control unit 6 then sequentially performs the processing of the foregoing steps S114, S115, and S116. FIG. 9B illustrates state transitions by the processing of step S106 and subsequent steps when it is determined that the carriage unit 49 has not successfully moved to the position X2 in step S105.

As described above, the adjustment members 55 and 56 displace the sliding members 58 and 59 with respect to the carriage 50 in the second direction orthogonal to the conveyance direction of the sheet P and the scanning direction of the carriage unit 49. Such a gap switching operation for displacing the sliding member 58 with respect to the carriage 50 in the second direction by the adjustment member 55 in contact with the contact member 71 will be referred to as a first displacement operation. Similarly, a gap switching operation for displacing the sliding member 59 by the adjustment member 56 in contact with the contact member 73 will be referred to as a second displacement operation. If the adjustment members 55 and 56 fail to simultaneously slide due to an increase in the driving load of the carriage unit 49, the contact members 71 and 73 are individually controlled to sequentially slide the adjustment members 55 and 56 with a time difference. Here, the contact member 71 is switched to the contact position prior to the contact member 73. Since the sliding operations themselves of the adjustment members 55 and 56 are separately performed, the first and second displacement operations also have a time difference therebetween. The gap can be switched by such processing.

There are provided one upstream-side contact member 71 and one downstream-side contact member 73. However, the numbers of contact members 71 and 73 are not limited thereto. Upstream-side contact members 71 may be provided near each end of the scanning range of the carriage unit 49. Downstream-side contact member 73 may be provided near each end of the scanning range of the carriage unit 49. In such a case, the operations illustrated in FIGS. 4A to 4C and 6A to 6C can be performed on one end side in the scanning direction, and the operations illustrated in FIGS. 5A to 5C and 7A to 7C can be performed on the other end side. The contact members on either one of the upstream and downstream sides can thus be constantly located in the contact positions.

Now, a second exemplary embodiment will be described. In the recording apparatus 1 according to the first exemplary embodiment, the adjustment members 55 and 56 are separately slid in the X direction if the driving load of the carriage unit 49 increases. During the sliding of the adjustment members 55 and 56 in the X direction, the effect on the sliding load is the highest when the distances between the sliding members 58 and 59 and the carriage 50 are actually being changed. In other words, even if the adjustment members 55 and 56 can be simultaneously slid in the X direction, the gap switching on the upstream side and that on downstream side, i.e., the first and second displacement operations may not be simultaneously performed. In the second exemplary embodiment, the gap switching on the upstream side and that on the downstream side are successively performed with a time difference therebetween. The description deals mainly with different points from the first exemplary embodiment.

FIG. 10 is a flowchart illustrating a procedure of the gap switching according to the second exemplary embodiment. FIG. 10 corresponds to FIG. 8 according to the first exemplary embodiment. FIG. 11 illustrates state transitions corresponding to the procedure illustrated in FIG. 10. FIG. 11 corresponds to FIGS. 9A and 9B according to the first exemplary embodiment. In step S201, the processing starts. In step S202, the control unit 6 moves and scans with the carriage unit 49 in the X direction to the gap switching preparation position X1. In step S203, the control unit 6 switches both the upstream- and downstream-side contact members 71 and 73 to the contact positions. In step S204, the control unit 6 drives and moves the carriage unit 49 to the position X2 which is a gap switching end position. The adjustment members 55 and 56 are configured such that if the adjustment members 55 and 56 simultaneously come into contact with the contact members 71 and 73 and start sliding, the adjustment members 55 and 56 actually switch the gap at different timings. Specifically, the abutting portions 56a and 56b of the downstream-side adjustment member 56 are arranged in a positional relationship different from that of the abutting portions 55a and 55b of the upstream-side adjustment member 55. The movement to the position X2 initially switches the distance between the carriage 50 and the upstream-side sliding member 58 in the Z direction from L1 to L2, i.e., changes the distance by ΔL. The distance between the carriage 50 and the downstream-side sliding member 59 in the Z direction is then switched from L3 to L4, i.e., changed by ΔL. As illustrated in FIG. 11, after the gap on the upstream side is switched from L1 to L2, the gap on the downstream side is switched from L3 to L4. On both sides, the gap is switched by the same amount ΔL. The carriage 50 thus eventually returns to horizontal, with the gap changed by ΔL. After step S204, in step S205, the control unit 6 moves the carriage unit 49 to the position X3 where the carriage unit 49 is separated from the contact members 71 and 73. In step S206, the control unit 6 switches both the contact members 71 and 73 to the non-contact positions. In step S207, the processing ends.

In the foregoing description, the positional relationship of arrangement of the abutting portions 55a, 55b, 56a, and 56b on the adjustment members 55 and 56 is changed to provide different timings for gap switching. However, the technique for shifting the timing of gap switching is not limited thereto. For example, the abutting portions 55a, 55b, 56a, and 56b may be similarly arranged on the adjustment members 55 and 56 while the protrusions 55f and 56f are arranged on the adjustment members 55 and 56 in different positional relationships. In such a case, the adjustment members 55 and 56 start to slide at different timings, whereby the gap is actually switched at different timings. Even upstream-side contact members 71 may be arranged near respective ends of the carriage unit 49, and downstream-side contact members 73 may be arranged near respective ends of the carriage unit 49. In such a case, all the contact members 71 and 73 may be constantly located in the contact positions.

The recording apparatuses which perform image recording by using a recording head have been described above. However, the invention is not limited thereto. An exemplary embodiment may be applied to a scanner apparatus including a carriage that scans and moves a reading head with respect to a sheet while reading an image. In other words, the present disclosure is widely applicable to apparatuses which include a carriage that has a recording head, a reading head, or other processing heads mounted thereon and scans and moves the head with respect to an object.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-149979, filed Jul. 29, 2016, which is hereby incorporated by reference herein in its entirety.

What is claimed is:

1. A recording apparatus comprising:
a carriage configured to reciprocate in a first direction, a recording head being mounted on the carriage;
a first guide member configured to guide movement of the carriage in the first direction;
a second guide member provided opposite from the first guide member in a second direction crossing the first direction, wherein the carriage is provided between the first guide member and the second guide member;
a first adjustment unit configured to adjust a first height of the carriage relative to the first guide member through the movement of the carriage;
a second adjustment unit configured to adjust a second height of the carriage relative to the second guide member through the movement of the carriage; and
a control unit to sequentially perform a first operation of changing the first height by the first adjustment unit and a second operation of changing the second height by the second adjustment unit.

2. The recording apparatus according to claim 1, wherein the first adjustment unit includes a first adjustment member and a first contact member, the first adjustment member being capable of sliding relative to the carriage in the first direction to change the first height, and the first contact member being displaceable to a contact position where it is possible to contact with the first adjustment member and to a retracted position where it is impossible to contact with the first adjustment member;
wherein the second adjustment unit includes a second adjustment member and a second contact member, the second adjustment member being capable of sliding relative to the carriage in the first direction to change the second height, and the second contact member being displaceable to a contact position where it is possible to contact with the second adjustment member and to a retracted position where it is impossible to contact with the second adjustment member; and
wherein the first operation is performed by the first adjustment member and the first contact member at the contact position coming into contact and by sliding of the first adjustment member, and the second operation is performed by the second adjustment member and the second contact member at the contact position coming into contact and by sliding of the second adjustment member.

3. The recording apparatus according to claim 2, wherein the first adjustment member includes a first protrusion protruding in the second direction capable of making contact with the first contact member, and second contact member include a second protrusion protruding in the second direction capable of making contact with the second contact member.

4. The recording apparatus according to claim 2, further comprising:
a first driving source configured to displace the first contact member; and
a second driving source different from the first driving source configured to displace the second contact member.

5. The recording apparatus according to claim 1, wherein the control unit is able to execute a simultaneous operation which simultaneously performs the first operation and the second operation and a sequential operation which sequentially performs the first operation and the second operation.

6. The recording apparatus according to claim 5, wherein the control unit controls to perform the sequential operation in a case where the control unit fails to make a predetermined displacement of the carriage after performing the simultaneous operation.

7. The recording apparatus according to claim 5, wherein the control unit controls to perform the sequential operation in a case where the control unit fails to make a predetermined displacement of the carriage after a predetermined number of times of performing the simultaneous operation.

8. The recording apparatus according to claim 1, further comprising a conveyance unit configured to convey sheet in the second direction, wherein the first guide member is provided upstream of the carriage in the second direction, and the second guide member is provided downstream of the carriage in the second direction.

\* \* \* \* \*